United States Patent [19]

Koike et al.

[11] Patent Number: 4,472,813
[45] Date of Patent: Sep. 18, 1984

[54] TRANSMISSION SYSTEM FOR INTENTIONALLY VIOLATING A CLASS IV PARTIAL RESPONSE CODE TO DISTINGUISH SUBSIDIARY SIGNALS FROM AN ERROR

[75] Inventors: Shin'ichi Koike; Eiichi Kobayashi, both of Tokyo, Japan

[73] Assignee: Nippon Electric Co., Ltd., Tokyo, Japan

[21] Appl. No.: 362,944

[22] Filed: Mar. 29, 1982

[30] Foreign Application Priority Data

Mar. 30, 1981 [JP] Japan .................................. 56-45567
Sep. 4, 1981 [JP] Japan ................................. 56-139456
Feb. 23, 1982 [JP] Japan ................................. 57-26823

[51] Int. Cl.³ ............................................. H04B 1/62
[52] U.S. Cl. ...................................... 375/18; 375/34; 340/347 DD
[58] Field of Search ...................... 375/17, 18, 19, 20, 375/34; 370/48, 56; 340/347 DD; 371/60, 62, 64; 328/162

[56] References Cited

U.S. PATENT DOCUMENTS

Re. 30,182 12/1979 Howson ................................. 375/18
3,829,779 8/1974 Fujimoto ............................... 375/18
3,947,767 3/1976 Koike et al. .......................... 375/18
4,086,566 4/1978 Lender .................................. 375/18

Primary Examiner—Robert L. Griffin
Assistant Examiner—Stephen Chin
Attorney, Agent, or Firm—Sughrue, Mion, Zinn, Macpeak & Seas

[57] ABSTRACT

In a transmission system of a class IV partial response code succession produced in accordance with a predetermined encoding rule, a transmitter intentionally violates the encoding rule to carry a subsidiary signal, so that an intentional violation appears in a receiver as two consecutive violation signals located in every other time slot, differing from an unintentional violation occurring during transmission. In the transmitter, an intermediate succession from a precoder is monitored by a detection circuit to detect an appearance of each predetermined pattern and to give the intentional violation to the code succession. In the receiver, a violation detector detects both of the intentional and the unintentional violations in accordance with a detecting rule to produce a violation signal sequence. The two consecutive violation signals are distinguished from the violation signal sequence by another detector. As the predetermined patterns, two and twelve patterns are usable in a binary and a quaternary system, respectively.

16 Claims, 11 Drawing Figures

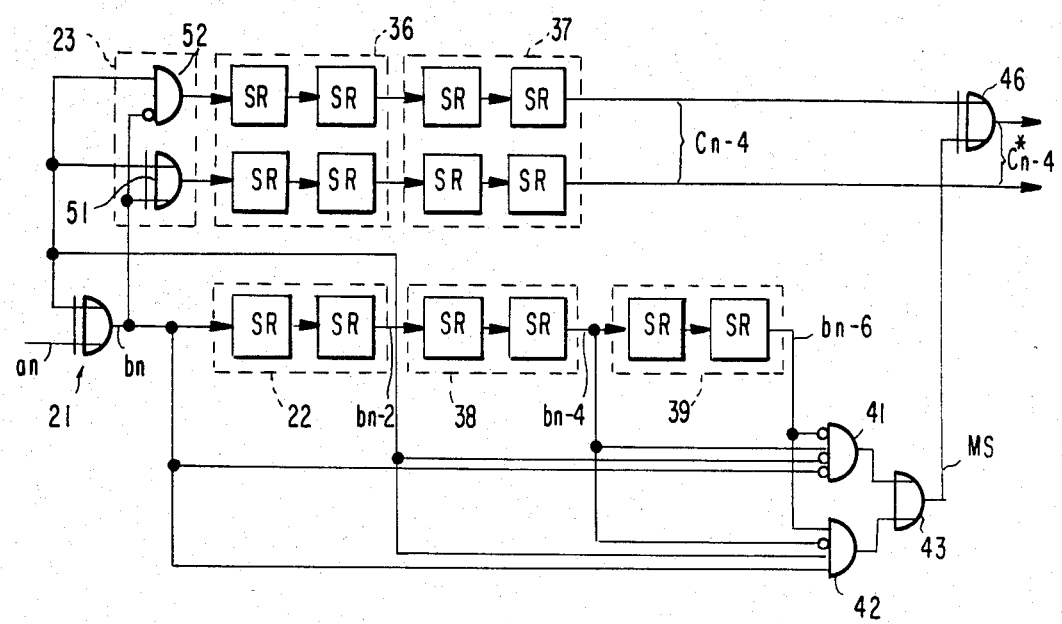
FIG. 4
FIG. 5
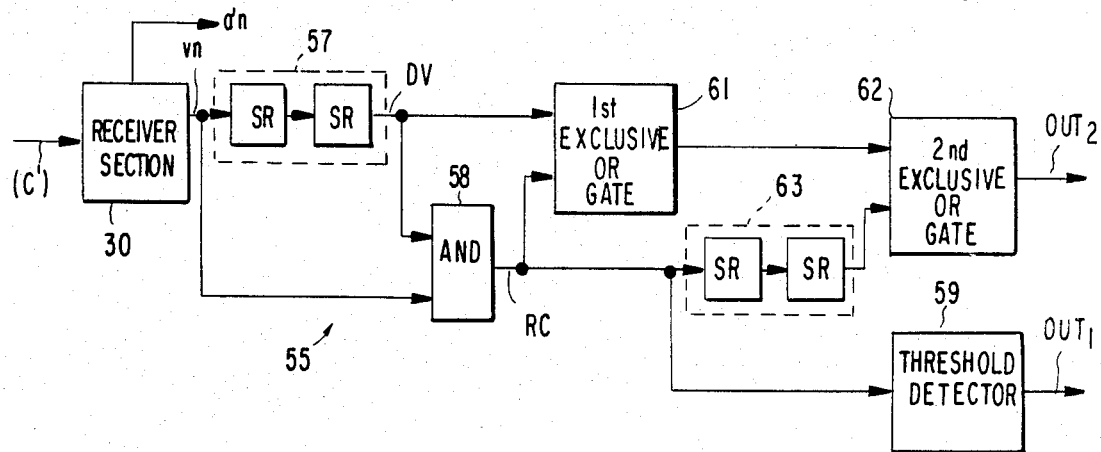
FIG. 6
```
       X   X X   X X   X X   X X   X X   X X   X X
(a)  0 0 0 1 1 0 1 1 0 1 0 0 1 0 0 1 1 1 1 0 0 1 0 0 0 0 1 1 1 1 0...
(b)  0 0 0 1 1 1 0 0 0 1 0 1 1 1 0 0 1 1 0 1 0 0 0 0 0 0 1 1 0 0 0...
(c)  0 0 0 1 1 0 -1 -1 0 1 0 1 0 0 -1 -1 1 1 -1 0 0 -1 0 0 0 0 1 1 -1 -1 0...
          ↓       ↓           ↓                       ↓
(c*) 0 0 0 1 ① 0 -1 ① 0 1 0 0 1 0 0 -1 ① 1 1 -1 0 0 -1 0 0 0 0 ① 1 -1 -1 0...
(c') 0 0 0 -1 1 0 -1 1 1 0 1 0 0 0 ① 0 -1 1 1 1 1 -1 0 0 -1 0 0 0 0 -1 1 -1 -1 0...
(a') 0 0 0 1 1 0 1 1 0 1 0 0 1 ① 0 1 1 1 1 1 0 0 1 0 0 0 0 1 1 1 1 0...
(s)  0 0 0 0 -1 1 -1 2 1 2 1 1 1 1 2 1 0 2 1 2 0 1 0 0 0 0 0 -1 1 -1 0 0...
(v)  0 0 0 0 1 0 1 1 0 1 0 0 0 ① 0 0 1 0 1 0 0 0 0 0 0 0 0 0 1 0 1 0 0...
(s') 0 0 0 1 0 1 0 1 0 1 0 1 1 1 1 0 1 1 1 0 1 0 0 0 0 0 0 0 1 0 0 0...
```

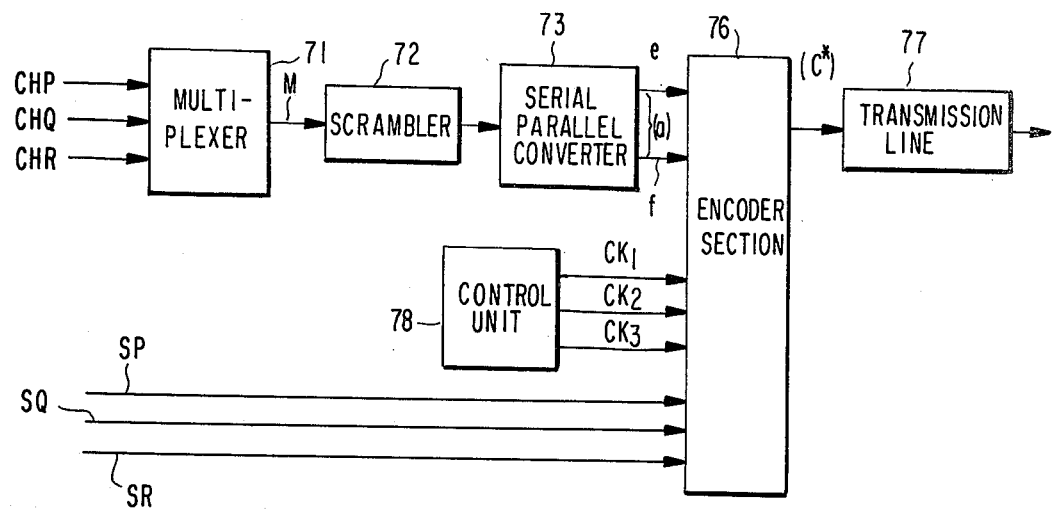

TRANSMISSION SYSTEM FOR INTENTIONALLY VIOLATING A CLASS IV PARTIAL RESPONSE CODE TO DISTINGUISH SUBSIDIARY SIGNALS FROM AN ERROR

BACKGROUND OF THE INVENTION

This invention relates to a transmission system of a class IV partial response code.

It is known in the art that a class IV partial response code of the type described is given from a transmitter by encoding an input signal in accordance with a predetermined encoding rule determined therefor and is accompanied by redundancy. With such a code, it is possible to detect, in a receiver, a code error undesiredly occurring during transmission from the transmitter to the receiver. Practically, such a code error is detected in the receiver by monitoring a disturbance or violation of the encoding rule which results from the code error.

It is also known in the art that a pair of bipolar code sequences are interleaved with each other in a succession of the class IV partial response code. As to a bipolar code, recent interests have been directed to a simultaneous transmission of a main signal and subsidiary signals, such as alarm information, commands, control information, and the like. Such subsidiary signals can be transmitted by intentionally disturbing or violating an encoding rule of the bipolar code by the use of redundancy accompanying the bipolar code. This may apply to the class IV partial response code.

However, it is conventional thought that, in the class IV partial response code, detection of the code error is never compatible with the simultaneous transmission of the subsidiary signals and the main signal.

When consideration is made of a succession of a multilevel class IV partial response code carrying a plurality of data signal successions arranged in the form of blocks in the code sequence, it should be necessary to locate each of the blocks, as will later be described with reference to one of eleven figures of the accompanying drawing. For this purpose, a block synchronizing signal may be arranged in a time slot allotted to the block synchronizing signal. However, it is not preferable in a transmission rate to prepare, in the code succession, such a time slot particular to the block synchronizing signal.

SUMMARY OF THE INVENTION

It is an object of this invention to provide a transmission system of a class IV partial response code, wherein detection of a code error is compatible with simultaneous transmission of a main signal and subsidiary signals.

It is another object of this invention to provide a transmission system of a multilevel class IV partial response code, wherein a plurality of subsidiary signals can be transmitted without a reduction of a transmission rate.

It is yet another object of this invention to provide a transmission system of the type described, wherein a block synchronizing signal can be transmitted as one of the subsidiary signals.

It is still another object of this invention to provide a transmission system of the type described, wherein the multilevel class IV response code is rarely disturbed in its attribute even when an encoding rule is violated to transmit the subsidiary signals.

A data transmission system to which this invention is applicable comprises a transmitter responsive to a transmitter input symbol succession of symbols located in every time slot for producing a transmitter output symbol succession in accordance with an encoding rule determined for a class IV partial response code and a receiver responsive to a receiver input symbol succession of the class IV partial response code for producing a receiver output symbol succession as a reproduction of the transmitter input symbol succession. The transmitter output symbol succession is undesiredly subjected to unintentional violations during transmission from the transmitter to the receiver and appears as the receiver input symbol succession. The encoding rule is disturbed by the unintentional violations. The transmitter input symbol succession includes a predetermined sequence of the symbols arranged in every other time slot and an additional sequence of the symbols arranged in the remaining time slots with the predetermined and the additional sequences interleaved with each other. According to this invention, the transmitter comprises first means responsive to the transmitter input symbol succession and a feedback symbol succession of feedback symbols for carrying out addition of each of the transmitter input symbols and each of the feedback symbols to produce an intermediate symbol succession of intermediate symbols located one in every time slot, second means coupled to the first means for producing an encoded symbol succession of encoded symbols, one in each time slot, in conformity to the encoding rule with reference to the intermediate symbols, and third means responsive to the intermediate symbol succession for delaying each of the intermediate symbols to produce first, second, and third ones of the intermediate symbols that are earlier than a particular symbol of the intermediate symbols by two, four, and six time slots, respectively. The first intermediate symbol is successively fed back to the first means as each of the feedback symbols. The particular intermediate symbol is produced in response to a particular one of the transmitter input symbols. The transmitter further comprises fourth means coupled to the third means and responsive to a symbol group of the third, the second, the first, and the particular intermediate symbols arranged in succession for monitoring the symbol group to produce an intentional violation signal indicative of an intentional violation for intentionally disturbing the encoding rule each time when a pattern given by the symbol group is coincident with one of predetermined patterns and fifth means coupled to the second means and the fourth means for modifying the encoded symbol succession by the intentional violation signal into the transmitter output symbol succession. The receiver comprises means for decoding the receiver input symbol succession into the reproduction of the transmitter input symbol succession without influence of the intentional violation and first detecting means for detecting both of the unintentional and the intentional violations from the receiver input symbol succession to produce a sequence of violation signals which are representative of both violations with said violation signals located in the time slots, respectively. Each of the unintentional violations appears as a sole violation signal in the violation signal sequence while each of the intentional violations appears as two consecutive ones of said violation signals located in two consecutive ones of the time slots with one time slot left therebetween. Each of the predetermined patterns is selected so that each of the intentional violations is detected as the two consecutive violation signals and second detecting means for distinguishing the intentional violations from the violation signal sequence.

BRIEF DESCRIPTION OF THE DRAWING

FIG. 4 shows a block diagram for describing in detail the transmitter illustrated in FIG. 3;

FIG. 5 shows a block diagram of a receiver for use in combination with the transmitter illustrated in FIGS. 3 and 4;

FIG. 6 shows a time chart for describing operation of the transmitter and the receiver illustrated in FIGS. 3, 4, and 5;

FIG. 7 is a block diagram of a transmitter used in a transmission system according to a second embodiment of this invention;

FIG. 8 shows a time chart for describing operation of the transmitter illustrated in FIG. 7;

DESCRIPTION OF THE PREFERRED EMBODIMENTS

(1) General System

Figure 1:
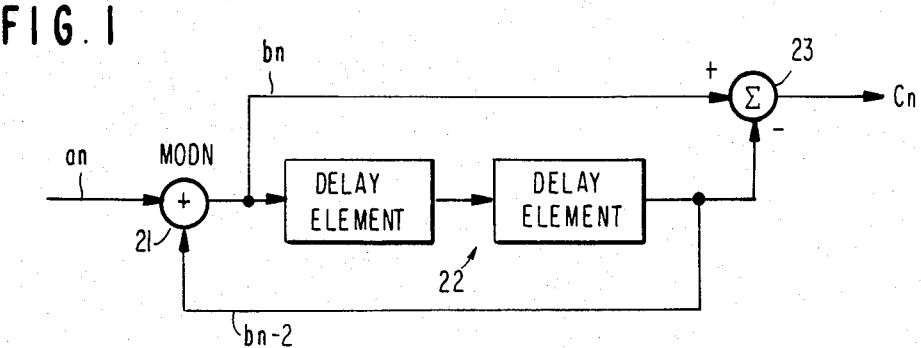
FIG. 1 is a block diagram of an encoder to which this invention is applicable.
Figure 2:
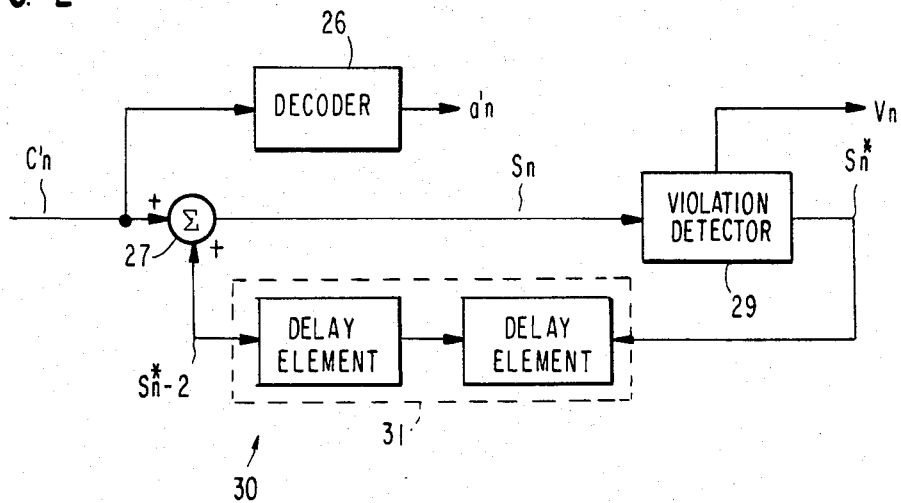
FIG. 2 is a block diagram of a receiver section to which this invention is applicable.

Referring to FIGS. 1 and 2, a class IV partial response code will be described for a better understanding of this invention. In FIG. 1, an encoder to which this invention is applicable is for use in encoding an N-ary input symbol succession into an output symbol succession with reference to an intermediate symbol succession. The input and the output symbol successions may often be referred to as a transmitter input and a transmitter output succession, respectively. The output symbol succession may be called a class IV partial response code succession. It is noted here that the input, the intermediate, and the output successions are represented by a, b, and c in brackets, respectively, and that the numbers of time slots are attached as suffixes to symbols in those successions. For example, the symbols in a particular time slot n are designated by $a_n$, $b_n$, $c_n$, or the like. Furthermore, each symbol of the input and the intermediate symbol successions [a] and [b] has levels equal to N in number and laid from a zeroth level to an $(N-1)$-th level while the output symbol succession has levels equal to $(2N-1)$ in number and laid from a minus $(N-1)$-th level to a plus $(N-1)$-th level through a zeroth level. Typically, the number N is equal to either two or four.

As known in the art, the class IV partial response code succession can carry a pair of different sequences in an interleaved manner. Specifically, a predetermined sequence of symbols is arranged as one of the sequence pair in every other time slot of the input symbol succession [a] while an additional sequence of symbols is arranged in the remaining time slots. Thus, the predetermined sequence is interleaved with the additional sequence in the input symbol succession [a]. Consequently, each of the intermediate an the output symbol successions is related to both of the predetermined and the additional sequences. Consideration will mainly be directed to those successions related to the predetermined sequence.

The illustrated encoder comprises an adder 21 for carrying out addition modulo N to produce the intermediate symbol succession [b] of intermediate symbols $b_n$ located in every time slot. The intermediate symbol succession [b] is delayed by two time slots through a pair of delay elements, collectively shown at 22, each being for delaying each symbol of the intermediate symbol succession [b] by a unit time slot. The delayed intermediate symbol is fed back to the adder 21 as a feedback symbol delayed by two time slots. From this fact, it is readily understood that the feedback symbol may be designated by $b_{n-2}$ and that the adder 21 carries out addition of each input symbol $a_n$ and each feedback symbol $b_{n-2}$, modulo N. The addition is, therefore, given by:

$$b_n = a_n \oplus b_{n-2} \pmod{N} \tag{1}$$

where the encircled plus sign is representative of the addition modulo N. A combination of the adder 21 and the delay element pair 22 may be called a precoder as usual.

The intermediate symbol $b_n$ is given to a subtractor 23 together with the feedback symbol $b_{n-2}$ to produce the output symbol $c_n$ as a result of subtraction. The output symbol $c_n$ is represented by:

$$c_n = b_n - b_{n-2}. \tag{2}$$

This means that the input symbol succession [a] is encoded into the output symbol succession [c] with reference to the intermediate symbol succession [b]. Therefore, Equation (2) defines an encoding rule of the class IV partial response code. In this sense, the output symbol succession sent from the subtractor 23 may be called an encoded symbol succession.

The output symbol succession is sent to a transmission line as the transmitter output succession and is received by a receiver as a receiver input symbol succession.

In FIG. 2, a receiver section 30 to which this invention is also applicable is operable to decode the receiver input symbol succession into a receiver output symbol succession [a'] as a reproduction of the transmitter input symbol succession [a]. The transmitter output symbol succession may be subjected to unintentional violations during transmission from the encoder illustrated in FIG. 1 to the receiver illustrated in FIG. 2 and appears as the receiver input symbol succession. Therefore, the receiver input symbol succession is represented by [c']. Likewise, a dash (') is attached to each symbol of the succession [c']. Hence, a particular symbol of the succession [c'] is shown at $c_n'$. As is the case with the transmitter output symbol, the particular symbol $c_n'$ has one of the $(2N-1)$ levels.

The illustrated receiver section 30 comprises a decoder 26 for decoding the receiver input symbol succession [c'] into the receiver output symbol succession [a']. More specifically, each symbol of the receiver input symbol succession [c'] is calculated modulo N in the decoder 26 to be decoded into each symbol of the succession [a']. The decoded symbol has one of levels equal to N in number, as is the case with the transmitter input symbol succession [a]. For example, if the particular symbol $c_n'$ has a level between the zeroth and the (N−1)-th level, the level is kept intact to be produced as an output symbol $a_n'$. Otherwise, the level of $c_n'$ is subjected to subtraction or addition of the number of N called a modulus number.

As is apparent from substitution of Equation (1) into (2), the decoding operation of the decoder 26 is defined by:

$$a_n' = c_n' \pmod{N}.$$

Supplied with the receiver input symbol succession [c'], a sum circuit 27 carried out a summation of each symbol of the receiver input symbol succession [c'] and an additional symbol (as will be presently described) to supply a violation detector 29 with a sum symbol representative of a result of the summation. In FIG. 2, the sum symbol $s_n$ is sent from the sum circuit 27 to the violation detector 29 in response to the particular input symbol $c_n'$. The sum symbol $s_n$ possibly takes various kinds of levels more than (2N−1) in number because of presence of the violations.

The violations detector 29 serves to detect the unintentional violations to produce a sequence of violation signals, each being representative of presence of each violation, together with a modified sum succession [s*] of modified sum symbols typified by a particular modified sum symbol $s_n^*$. The violation signals and the particular modified sum symbol $s_n^*$ are given in accordance with the following detecting rules.

(i) When the level of the particular sum symbol $s_n$ is equal to or more than a level N, the violation signal $v_n$ appears and the level of the particular modified sum symbol $s_n^*$ is put into the level of N−1.

(ii) When the level of the particular sum symbol $s_n$ is less than the level of 0, that is, $s_n \leq -1$, the violation signal $v_n$ is also produced and the level of the modified particular sum symbol s* is put into 0.

(iii) When the level of $s_n$ is between 0 and N−1, both inclusive, no violation signal $v_n$ is produced and the level of $s_n$ is kept intact to be produced as the level of $s_n^*$.

According to the above-mentioned rules, the particular sum symbol $s_n$ is converted into the N-ary modified sum symbol $s_n^*$. In practice, the violation detector 29 comprises a limiter for limiting the level of the sum symbol $s_n$ to the levels of N−1 and 0 even when the level of the sum symbol $s_n$ is changed beyond the levels of N−1 and 0.

The modified sum symbol succession [s*] is fed back through a pair of delay elements, collectively shown at 31, to the sum circuit 27. Each delay element has a delay time equal to a unit time slot. Accordingly, the sum circuit 27 is supplied as the additional symbol succession with the symbol of the modified sum symbol succession [s*] delayed by two time slots relative to the particular time slot. From the above, it appears that the symbol of the additional symbol succession [s*] is depicted at $s^*_{n-2}$.

It is mentioned here that a code error resulting from the unintentional violation of a transmission line appears in the form of a single level shift from a correct level to the nearest level, when an error ratio is relatively low on the transmission line. When the single level shift takes place in connection with a certain symbol, the code error owing to the single level shift does not affect the following symbol spaced with a time slot interposed therebetween. This means that the violation signal $v_n$ solely appears on occurrence of the code error resulting from the unintentional violation. In other words, the violation signals $v_n$ are not consecutively produced two times or more at every other time slot. As a result, if a violation signal $v_k$ appears in a time slot k, it may be assumed that no violation signal appears in the next following time slot k+2 on occurrence of the unintentional violation.

By the use of the above-mentioned nature of the class IV partial response code, this invention intentionally gives violations by disturbing the encoding rule of Equation (2) in a transmitter so that two consecutive violation signals appear in a receiver with a time slot interposed therebetween. Such violations may be named intentional violations in distinction from the unintentional violations. The two consecutive violation signals are distinguishable from a sole violation signal resulting from an unintentional violation Thus, by transmitting the intentional violation from the transmitter and by distinguishing the two consecutive violation signals from the sole violation signal, it is possible to transmit a subsidiary information signal or signals in addition to a main information signal represented by the predetermined sequence and the additional sequence [a].

Symbol patterns should be selected to give such an intentional violation bringing about two consecutive violation signals. Considering those four consecutive symbols ($b_{n-6}$, $b_{n-4}$, $b_{n-2}$, $b_n$) of the intermediate symbol succession [b] positioned in every other time slot, a plurality of such patterns have been found according to the inventors' experimental studies. The four consecutive symbols are assumed to be related to the predetermined sequence of the transmitter input symbol succession [a], with the additional sequence left out of consideration.

(2) Binary System

More particularly, when the N-ary receiver input symbol succession [a] is given in the form of a binary succession, two patterns AA and AB of the intermediate symbols ($b_{n-6}$, $b_{n-4}$, $b_{n-2}$, $b_n$) may be considered relative to the particular transmitter input symbol $a_n$, as in Table 1.

TABLE 1

|    | $b_{n-6}$ | x | $b_{n-4}$ | x | $b_{n-2}$ | x | $b_n$ |
|----|-----------|---|-----------|---|-----------|---|-------|
| AA | 0         | x | 1         | x | 0         | x | 0     |
| AB | 1         | x | 0         | x | 1         | x | 1     |

In Table 1, each of crisscrosses is representative of a symbol related to the additional sequence. Let a violation operation be carried out in synchronism with the symbol $b_{n-4}$ and specified by subtracting a level of the modulus number "2" from the level of that symbol of the output symbol succession [c] which appears in timed relation to the symbol $b_{n-4}$. Such subtraction can be implemented by inverting the output symbol in polarity in the binary succession. Table 2 shows the violation operation in connection with the two patterns AA and AB listed in Table 1.

TABLE 2

| TIME SLOT | n-6 | n-4 | n-2 | n | | n-6 | n-4 | n-2 | n |
|---|---|---|---|---|---|---|---|---|---|
| AA | 0 x | 1 x | 0 x | 0 | AB | 1 x | 0 x | 1 x | 1 |
| [c] | Y x | 1 x | −1 x | 0 | [c] | Y x | −1 x | 1 x | 0 |
| [c*] | Y x | −1 x | −1 x | 0 | [c*] | Y x | 1 x | 1 x | 0 |

In Table 2, wherein Y is representative of any one of 0 and ±1, the output symbol succession [c] is subjected to the violation operation in the time slot (n−4) to be modified into a modified output symbol succession [c*]. As a result, the levels "1" and "−1" of each symbol $c_{n-4}$ appear as the inverted levels "−1" and "1" of each symbol $c^*_{n-4}$, respectively.

When the modified output symbol succession [c*] is received by the receiver illustrated in FIG. 2, it is correctly decoded into the receiver output symbol succession [a'] without any code error.

Moreover, the violation detector 29 produces the two consecutive violation signals positioned in every other time slot, in response to the modified output symbol succession [c*] subjected to the violation operation in the above-mentioned manner. These are because the violation operation is implemented by processing the level of the symbol $c_{n-4}$ by the use of the level of the modulus number "2." Thus, the intentional violations are distinguished from the code errors resulting from the unintentional violations and, therefore, can carry the subsidiary information succession.

Likewise, the subsidiary information succession can individually be carried together with the transmission output symbol succession related to the additional sequence.

(3) First Embodiment

Figure 3:
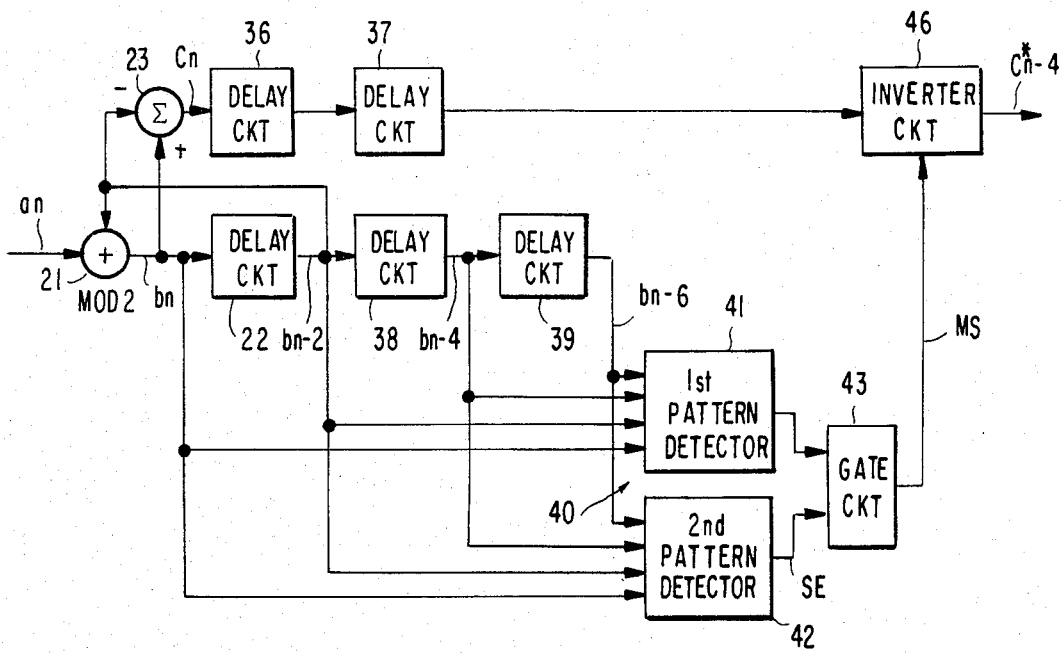
FIG. 3 is a schematic block diagram of a transmitter used in a transmission system according to a first embodiment of this invention.

Referring to FIG. 3, a transmission system according to a first embodiment of this invention comprises a transmitter comprising an adder 21 and a subtractor 23, as is the case with that illustrated in FIG. 1. A delay circuit depicted by a single block 22 is similar to the delay element pair 22 having the delay time equal to the two time slots. Each symbol of the input symbol succession [a] is represented by a binary signal having either of a logic "1" level and a logic "0" level. When a particular input symbol $a_n$ of the input symbol succession [a] is supplied during a particular time slot n to the adder 21 together with the feedback input symbol $b_{n-2}$, addition is carried out in the adder 21 in accordance with Equation (1). In this case, the adder 21 performs calculation modulo two and may, therefore, be an Exclusive OR gate. The adder 21 might be named a first circuit in the transmitter. The particular intermediate symbol $b_n$ is delivered to the subtractor 23 and the delay circuit 22. Inasmuch as the subtractor 23 is supplied with a feedback symbol $b_{n-2}$, the subtractor 23 calculates a difference between the particular intermediate symbol $b_n$ and the feedback symbol $b_{n-2}$ in accordance with Equation (2) to produce a particular output symbol $c_n$. Since each intermediate symbol is delayed during two time slots by the delay circuit 22, the feedback symbol $b_{n-2}$ is given by an intermediate symbol which precedes the particular intermediate symbol $b_n$ by two time slots and which may be referred to as a first intermediate symbol. The above-mentioned operation is successively progressed stepwise and, therefore, each of the output and the intermediate symbols appears in the form of a succession.

The output symbol succession [c] is delayed by a couple of delay circuits 36 and 37, each having a delay time equal to the two time slots. As a result, the delay circuit 37 produces an encoded symbol $c_{n-4}$ located in a time slot earlier than the particular time slot by four time slots. At any rate, a combination of the subtractor 23 and the delay circuits 36 and 37 serves to produce the encoded symbol succession, one in each time slot, in conformity to the encoding rule defined by Equation (2) with reference to the intermediate symbols $b_n$ and may be called a second circuit in the transmitter.

Responsive to the particular intermediate symbol $b_n$, the delay circuit 22 is followed by two of delay circuits 38 and 39, each having a delay time equal to two time slots, as is the case with the delay circuit 22. Accordingly, the delay circuits 38 and 39 give intermediate symbols produced four and six time slots before the particular time slot n, respectively and represented by $b_{n-4}$ and $b_{n-6}$, respectively. The respective intermediate symbols $b_{n-4}$ and $b_{n-6}$ will be referred to as second and third intermediate symbols. Thus, a series connection of the delay circuits 22, 38, and 39 is constituted by a shift register operable in a binary fashion and may be called a third circuit for synchronously producing the particular, the first, the second, and the third intermediate symbols $b_n$, $b_{n-2}$, $b_{n-4}$, and $b_{n-6}$. A permutation of the third, the second, the first, and the particular intermediate symbols is named a symbol group for brevity of description. It is mentioned here that four symbols of the symbol group are consecutively arranged one another in every other time slot and are all related to one of the predetermined and the additional sequences.

In FIG. 3, the illustrated transmitter comprises a detecting circuit 40 comprising, in turn, first and second pattern detectors 41 and 42. The first pattern detector 41 is coupled to the third circuit, namely, the delay circuits 22, 38, and 39 and responsive to the symbol group of the third through first intermediate symbols $b_{n-6}$, $b_{n-4}$, $b_{n-2}$ and the particular intermediate symbol $b_n$. The first pattern detector 41 serves to monitor and detect the pattern AA specified by "0, 1, 0, 0" in Table 1. When a pattern given by the symbol group $b_{n-6}-b_n$ is coincident with the pattern AA, the first pattern detector 41 produces a first enable signal FE.

The second pattern detector 42 is also coupled to the delay circuits 22, 38, and 39 to detect the pattern AB specified by "1, 0, 1, 1" and to produce a second enable signal SE when a pattern of the symbol group coincides with the pattern AB.

Each of the first and the second enable signals FE and SE appears through a gate circuit 43 as a modification signal MS in synchronism with the encoded symbol $c_{n-4}$.

Production of the modification signal MS represents an appearance of the same pattern as either of the patterns AA and AB. This means that the encoded symbol $c_{n-4}$ synchronized with the second intermediate symbol $b_{n-4}$ may be subjected to an intentional violation, as pointed out in the preceding paragraph of the instant specification. From this standpoint, the modification signal MS may be called an indication signal representative of an indication of an intentional violation different from an unintentional violation taking place in a transmission line. Thus, a combination of the first and the second pattern detectors 41 and 42 and the gate circuit 43 is operable to give an indication of the intentional violation and may be said to be a fourth circuit in the transmitter.

An inverter circuit 46 is coupled to the second and the fourth circuits and lends itself to modify the encoded symbol $c_{n-4}$ by the modification signal MS into a modified encoded symbol $c^*_{n-4}$. The modified encoded symbol $c^*_{n-4}$ is sent to the transmission line as an output symbol of the transmitter output symbol succession [c*]. Thus, the levels "1" and "−1" of each encoded symbol $c_{n-4}$ are inverted into "−1" and "1," respectively. As a result, the transmitter output symbol succession [c*] has patterns "Y, −1, −1, 0" and "Y, 1, 1, 0" in synchronism with the patterns AA and AB of the intermediate symbol patterns, as shown in Table 3, respectively. The inverter circuit 46 constitutes a fifth circuit in the transmitter. In the illustrated transmitter, the encoded symbol $c_{n-4}$ is automatically subjected to the intentional violation. It is, however, possible to control the modification signal MS by supplying a control signal (not shown) to the gate circuit 43.

Referring to FIG. 4, the transmitter illustrated with reference to FIG. 3 will more specifically be described to facilitate an understanding of this invention. The transmitter can be feasible by a combination of binary circuit elements shown in FIG. 4. In FIG. 4, circuits and signals corresponding to those illustrated in FIG. 3 are designated by like refernce numerals and letters. As shown in FIG. 4, the adder 21 is structured by an Exclusive OR gate and each of the delay circuits 22, 38, and 39 comprises a couple of binary shift registers labelled as SR. Each shift register has a delay time equal to a single time slot. The first and the second pattern detectors 41 and 42 are constituted by gates which produce the first and the second enable signals FE and SE when the patterns "0, 1, 0, 0" and "1, 0, 1, 1" appear, respectively. The gate circuit 43 is specified by an OR gate in the transmitter illustrated in FIG. 4.

Further, the subtractor 23 comprises an Exclusive OR gate 51 and an additional gate 52 both of which are supplied with the particular intermediate symbol $b_n$ and the feedback or first intermediate symbol $b_{n-2}$. As well known in the art, the Exclusive OR gate 51 gives a difference between the both symbol levels $(b_n)$ and $(b_{n-2})$ while the additional gate 52, a borrow when the particular symbol level $(b_n)$ is less than the first symbol level $(b_{n-2})$. Each of the difference and the borrow is given by a single bit. Thus, the particular encoded symbol $c_n$ which possibly takes three levels of "−1," "0," and "1," is indicated by a combination of two bits. Specifically, the particular encoded symbol $c_n$ is given in the form of a two's complement.

Coupled to the subtractor 23, the delay circuit 36 comprises a pair of binary shift registers connected in series to each other for the difference supplied from the Exclusive OR gate and another pair of binary shift register for the borrow given from the additional gate. Likewise, the delay circuits 37 comprises two rows of shift registers. These shift registers in the circuits 36 and 37 are similar to the shift registers used in the delay circuits 22, 38, and 39.

The inverter circuit 46 is depicted by an Exclusive OR gate connected in series to the shift registers for the borrow and to the gate circuit 43. As a result, the particular encoded symbol $c_{n-4}$ is polarity inverted during presence of the modification signal MS, namely, a logic "1" level thereof. On the other hand, the difference is produced without any modification. Thus, a combination of the difference and the modified encoded symbol appears as the output symbol $c^*_{n-4}$.

Referring to FIG. 5, a receiver for use in the transmission system according to the first embodiment of this invention comprises a receiver section 30 similar to that depicted at 30 in FIG. 2 except that the receiver section 30 in FIG. 5 is operable in a binary fashion. In FIG. 2, the receiver section 30 processes the receiver input symbol succession [c'] in an aforementioned manner to decode the receiver input symbol succession [c'] into the reproduction [a'] of the transmitter input symbol succession [a]. Concurrently, the receiver section 30 detects the unintentional and the intentional violations from the receiver input symbol succession [c'] by the use of the violation detector 29 to produce a sequence [v] of violation signals which are representative of detection of both violations. Each of the violation signals is positioned in a time slot. As mentioned before, each of the unintentional violations appears as a sole violation signal while each of the intentional violations appears as two consecutive ones of the violation signals located in two consecutive time slots with one time slot left therebetween. Thus, the receiver section 30 serves to detect both of the unintentional and the intentional violations and may, therefore, be called a detecting circuit.

The illustrated receiver comprises a circuit section 55 responsive to the violation signal sequence [v] for detecting or distinguishing the intentional violations from the violation signal sequence [v]. More particularly, the circuit section 55 comprises a receiver delay circuit 57 comprising a pair of delay elements, such as shift registers, each having a delay time equal to a single time slot. The receiver delay circuit 57 is supplied with the violation signal sequence [v] to delay each violation signal, such as $v_n$, by two time slots. The violation signal is, therefore, sent from the receiver delay circuit 57 as a delayed violation signal DV.

Responsive to the violation signal sequence [v] and the delayed violation signal DV, an AND gate 58 produces a violation reception signal RC representative of a reception of each intentional violation only when the violation signals coexist with the delayed violation signal. Thus, the AND gate 58 serves to detect two consecutive ones of the violation signals from the violation signal sequence with one time slot left therebetween.

The violation reception signal RC is supplied to a threshold detector 59 having a prescribed threshold level. The threshold detector 59 counts the violation reception signal in number to compare a result of counting with the prescribed threshold level. If the result exceeds the prescribed threshold level, the threshold detector 59 produces a first output signal $OUT_1$. The first output signal $OUT_1$ indicates that violation operation is carried out in the transmitter and, therefore, the receiver can know, by the use of the first output signal $OUT_1$, an intention informed from the transmitter. Thus, a subsidiary signal can be transmitted from the transmitter to the receiver.

In FIG. 5, the circuit section 55 further comprises a first Exclusive OR gate 61 responsive to the delayed violation signal DV and the violation reception signal RC. The first Exclusive OR gate 61 produces the logic "1" level only when either the delayed violation signal DV or the violation reception signal RC is supplied to the first Exclusive OR gate 61. In other words, the logic "1" level appears when the violation signal is not consecutive in every other time slot. The first Exclusive OR gate 61 is coupled to a second Exclusive OR gate 62 connected to the AND gate through a delay circuit 63 similar to the delay circuit 57. Thus, the violation reception signal RC is delayed by two time slots in the delay circuit 63 to be sent from the AND gate 58 to the second Exclusive OR gate 62.

At any rate, a sole violation signal is distinguished from the violation signal sequence [v] by the use of the first and the second Exclusive OR gates 61 and 62 and the delay circuit 63. As a result, the second Exclusive OR gate 62 gives a second output signal $OUT_2$ representative of a reception of the unintentional violation. The second output signal $OUT_2$ is used to correct a code error occurring during transmission from the transmitter to the receiver.

Referring to FIG. 6, operation will be described in detail in conjunction with the transmitter and the receiver illustrated with reference to FIGS. 3 and 5, respectively. The transmitter input symbol succession [a] interleaves the predetermined sequence with the additional sequence. Each sequence is arranged in every other time slot in the transmitter input symbol succession [a]. For purpose of distinction between the predetermined and the additional sequences, crisscrosses (x) are attached to the additional sequence, as shown atop of this figure.

In the intermediate symbol succession [b], the predetermined patterns AA and AB appear in connection with the predetermined and the additional sequences, as specified by four symbols bridged by broken lines.

The encoded symbol succession [c] which is encoded with reference to the intermediate symbol succession [b] is modified into the modified encoded symbol succession [c*] transmitted as the transmitter output symbol succession. Considering those four symbols of the successions [c] and [c*] that correspond to the bridged four symbols of the succession [b], the second symbols of the succession [c*] are inverted in polarity relative to those of the succession [c], as illustrated by encircled symbols in the succession [c*]. The polarity inversion is representative of the fact that the intentional violations are added to the succession [c*].

The receiver input symbol succession [c'] includes a code error specified by an encircled symbol therein. The code error results from an unintentional violation imposed during transmission.

The receiver input symbol succession [c] is decoded into the receiver output symbol succession [a'] by the receiver section 30 illustrated in FIG. 2. As is clear from comparison of the succession [a] with [a'], the symbols subjected to the intentional violations are correctly decoded without code errors while the symbol subjected to the unintentional violation is erroneously decoded by the receiver section 30.

In the sum symbol succession [s], the levels of "−1" and "2" result from the intentional and the unintentional violations. Consequently, the violation signal sequence shown at [v] is produced by the violation detector 29 illustrated in FIG. 2. Each intentional violation gives rise to two consecutive ones of the violation signals with one time slot spaced therebetween, as shown by two symbols bridged by full lines in the sequence [v]. On the other hand, the unintentional violation brings about a sole violation signal isolated from the remaining signals, as encompassed by a rectangle. Such a sole violation signal is produced as the second output signal $OUT_2$ from the second Exclusive OR gate 62 and serves to correct the code error appearing in the receiver output symbol succession [a']. Merely for reference, the modified sum symbol succession is also illustrated in FIG. 5.

(4) Quaternary System

When the N-ary transmitter input symbol succession [a] is given in the form of a succession of a quaternary symbols, each having one of four levels, that is, 0, 1, 2, and 3, each symbol of the transmitter output symbol succession [c] is represented by one of seven levels, namely, −3, −2, −1, 0, 1, 2, and 3. Therefore, the output symbol may be called a septenary symbol. In this case, it has been found that the foregoing intentional violations can be given by monitoring twelve patterns of the four consecutive intermediate symbols $b_{n-6}$, $b_{n-4}$, $b_{n-2}$, and $b_n$, as shown in Table 3. In Table 3, the modified symbol succession [c*] and the sum symbol succession [s] are also shown along with the intermediate symbol succession [b].

TABLE 3

|    | [b]              | [c*]              | [s]              |
|----|------------------|-------------------|------------------|
| BA | 0 x 1 x 0 x 0    | Y x −3 x −1 x 0   | 0 x −3 x −1 x 0  |
| BB | 0 x 2 x 0 x 0    | Y x −2 x −2 x 0   | 0 x −2 x −2 x 0  |
| BC | 1 x 2 x 0 x 0    | Y x −3 x −2 x 0   | 1 x −2 x −2 x 0  |
| BD | 0 x 3 x 0 x 0    | Y x −1 x −3 x 0   | 0 x −1 x −3 x 0  |
| BE | 1 x 3 x 0 x 0    | Y x −2 x −3 x 0   | 1 x −1 x −3 x 0  |
| BF | 2 x 3 x 0 x 0    | Y x −3 x −3 x 0   | 2 x −1 x −3 x 0  |
| BG | 1 x 0 x 3 x 3    | Y x 3 x 3 x 0     | 1 x 4 x 6 x 3    |
| BH | 2 x 0 x 3 x 3    | Y x 2 x 3 x 0     | 2 x 4 x 6 x 3    |
| BI | 3 x 0 x 3 x 3    | Y x 1 x 3 x 0     | 3 x 4 x 6 x 3    |
| BJ | 2 x 1 x 3 x 3    | Y x 3 x 2 x 0     | 2 x 5 x 5 x 3    |
| BK | 3 x 1 x 3 x 3    | Y x 2 x 2 x 0     | 3 x 5 x 5 x 3    |
| BL | 3 x 2 x 3 x 3    | Y x 3 x 1 x 0     | 3 x 6 x 4 x 3    |

Herein, the patterns BB and BE will be described in detail by way of example. Like in the binary system, the violation operation is carried out in synchronism with that symbol of the patterns BB and BE which is positioned in the time slot (n−4). More particularly, the level corresponding to the modulus number N (=4) is substrated from the level of the encoded symbol $c_{n-4}$ positioned in the time slot (n−4). Table 4 shows the transmitter input symbol succession [a], the encoded symbol succession [c], the modified symbol succession [c*], and the receiver output symbol succession [a'] to describe the violation operation.

TABLE 4

|      | n-6 | n-4 | n-2 | n | n-6 | n-4 | n-2 | n |
|------|-----|-----|-----|---|-----|-----|-----|---|
| [a]  | Z x | 2 x | 2 x | 0 | Z x | 2 x | 1 x | 0 |
| [b]  | 0 x | 2 x | 0 x | 0 | 1 x | 3 x | 0 x | 0 |
| [c]  | Y x | 2 x | −2 x| 0 | Y x | 2 x | −3 x| 0 |
| [c*] | Y x | −2 x| −2 x| 0 | Y x | −2 x| −3 x| 0 |
| [a'] | Z x | 2 x | 2 x | 0 | Z x | 2 x | 1 x | 0 |

In Table 4, Z represents any one of the levels 0, 1, 2, and 3 while Y, any one of 0, ±1, ±2, and ±3.

As readily understood from Table 4, each symbol level "2" of the encoded symbol succession [c] is polarity inverted at the time slot (n−4) into the symbol level "−2," to be produced as the modified symbol succession [c*]. The polarity inversion results from the subtraction of the modulus number level from the symbol level "2."

The modified symbol succession [c*] subjected to such a violation is received without any code error, as shown from the receiver output symbol succession [a'] in Table 4.

As shown in Table 3, the sum symbol successions [s] take patterns of "0, −2, −2, and 0" and "1, −1, −3, and 0" when the patterns BB and BE are sent from the transmitter to the receiver, respectively.

When the detection rules described with reference to FIG. 2 are applied to the above-mentioned successions [s], it will be seen that the two consecutive violations take place in those successions [s] with one time slot spaced therebetween. Thus, each intentional violation given by the transmitter brings about two consecutive violation signals of the violation signal succession [v], as will later be described in detail, and distinguished from the unintentional violations. This enables the subsidiary signals to be transmitted from the transmitter to the receiver.

With the N-ary symbol, such as quaternary symbol, it is possible to transmit a plurality of bit streams as the main information signal. In order to avoid a misunderstanding, the bit streams may often be referred to as main streams. In the quaternary system, a pair of bits of two main streams are connected into one symbol of the quaternary symbol succession that has one of four levels. Each of the main streams includes, in a time division fashion, a plurality of information sequences which are given through a plurality of information channels and which are arranged in the form of information blocks. As a result, a combination of the information channels is varied with time in the quaternary symbol succession. Therefore, it is necessary to locate each of the information blocks in the quaternary symbol succession. To this end, a block synchronizing signal is transmitted as one of the subsidiary signals to locate and separate each information block.

In general, such a block synchronizing signal is positioned in a specified time slot different from time slots for transmitting an information sequence. However, a reduction of a transmission efficiency is inevitable for transmission of the block synchronizing signal, as pointed out in the preamble of the instant specification.

It has been found that the block synchronizing signal can be transmitted as one of the subsidiary signals from a transmitter to a receiver without a reduction of the transmission efficiency. Inasmuch as the subsidiary signals are produced by giving the intentional violation when the predetermined patterns appear in the intermediate symbol succession, as described before, the block synchronizing signal is interspersed in the transmitter output symbol succession only during presence of each predetermined pattern.

As a result, the block synchronizing signal may be irregularly distributed in the transmitter output symbol succession [c*]. However, it is possible to uniformly disperse the block synchronizing signal by the use of a scrambler. In addition, if one of the information blocks is located in the receiver input symbol succession by the block synchronizing signal, the receiver input symbol succession can be separated into the respective information blocks with reference to the one information block. Therefore, it is quite effective to transmit the block synchronizing signal by the use of the intentional violation.

(5) Second Embodiment

Referring to FIGS. 7 and 8, a transmitter is for use in a transmission system according to a second embodiment of this invention to transmit the transmitter output symbol succession [c*] of symbols having one of seven levels as described in the preceding chapter of the instant specification. The illustrated transmitter is supplied through first, second, and third channels CHP, CHQ, and CHR with first, second, and third data streams P, Q, and R. Each of the first through third data streams P, Q, and R is given at a predetermined transmission rate in a binary fashion to the transmitter and is separable into a plurality of data blocks, such as $P_1$-$P_4$; $Q_1$-$Q_4$; and $R_1$-$R_4$, as shown in FIG. 8.

The transmitter comprises a multiplexer 71 for multiplexing the first through third data streams P through R into a multiplexed data stream M in a time division fashion, as depicted at M in FIG. 8. The first through third data streams P through R are multiplexed by the multiplexer 71 by the use of a succession of clock pulses (not shown) having a clock rate equal to three times the transmission rate of each data stream. The multiplexed data stream M is sent through a scrambler 72 to a serial-parallel converter 73 in a manner of a random code succession. Thus, the predetermined patterns occurs in the random code succession in substantially equal probability.

Supplied with the random code succession, the serial-parallel converter 73 produces an input symbol succession [a] corresponding to the transmitter input symbol succession illustrated in FIGS. 1, 3, and 4. In FIG. 8, the input symbol succession [a] may be called the main stream and is separated into two parallel sequences labelled as [e] and [f]. This is because each symbol of the input symbol succession [a] is specified by one of four levels and can, therefore, be represented by two binary signals, as will later be described in detail.

In each of the parallel sequences [e] and [f], arrangement is made of data blocks derived from the channels CHP, CHQ, and CHR. Each data block in the parallel sequences [e] and [f] is of the random code succession and is, therefore, depicted at $P_1'$, $Q_1'$, $R_1'$; $P_2'$, $Q_2'$, $R_2'$; $P_3'$, $Q_3'$, $R_3'$; and $P_4'$, $Q_4'$, $R_4'$. It is mentioned here that each of the parallel sequences [e] and [f] includes both of the predetermined and the additional sequences described with reference to FIG. 6 in an interleaved manner.

The multiplexer 71, the scrambler 72, and the serial-parallel converter 73 are operable to combine and arrange the binary data streams P, Q, and R at every block to produce the input symbol succession [a]. At any rate, the illustrated succession [a] includes each symbol specified by a combination of the data bits of the binary data sequences.

Responsive to the input symbol succession [a], an encoder section 76 corresponding to the transmitter illustrated in each of FIGS. 3 and 4 is put into operation in a manner to be described later to produce a modified symbol succession [c*] of symbols having one of the seven levels. The modified symbol succession [c*] is sent from the transmitter to a transmission line 77 as the transmitter output symbol succession [c*].

Figure 9:
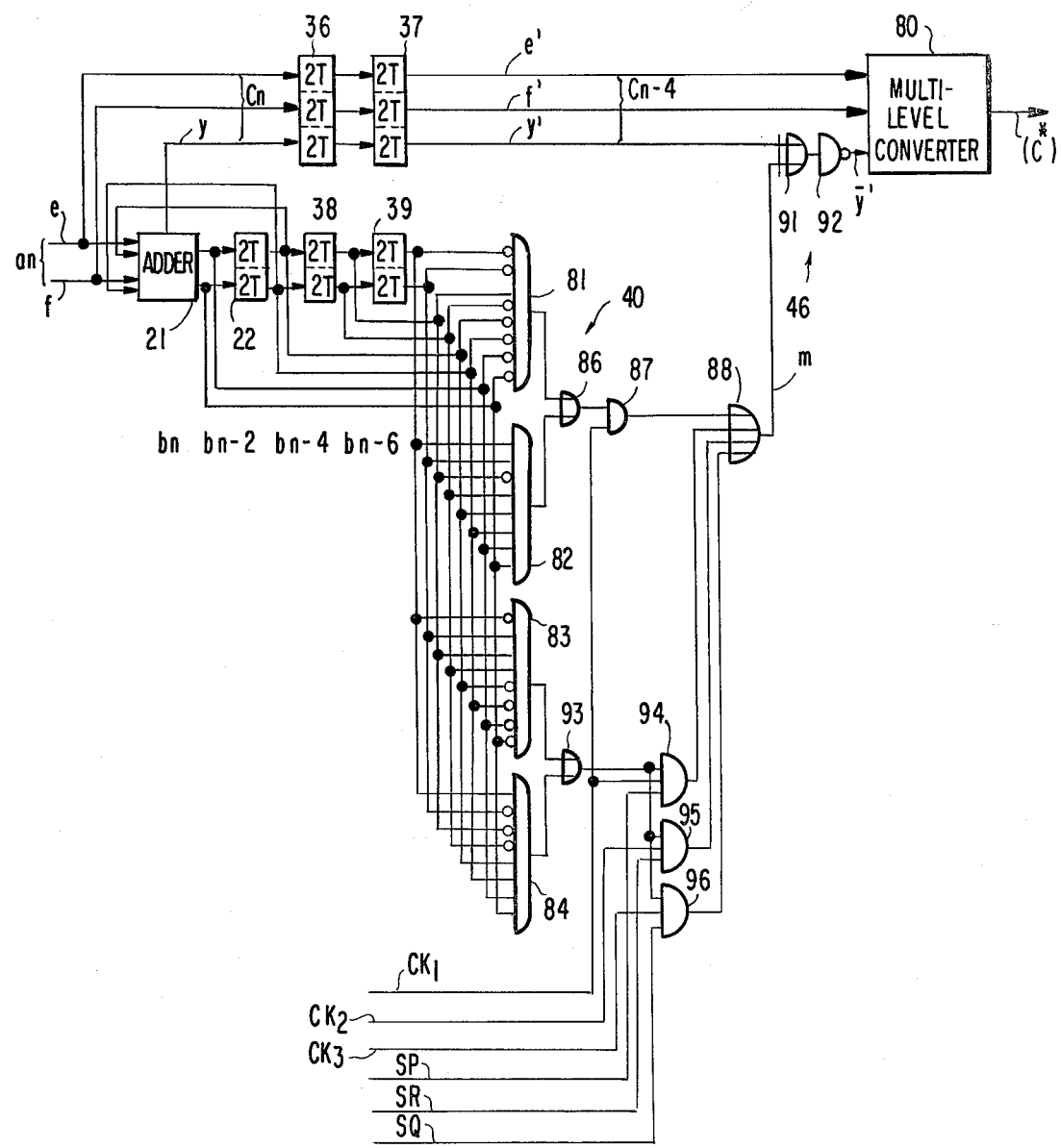
FIG. 9 shows a block diagram of an encoder section used in the transmitter illustrated in FIG. 7.

Referring to FIGS. 7 and 8 again and FIG. 9 afresh, the encoder section 76 is coupled to a control unit 78 for producing block pulses $CK_1$, $CK_2$, and $CK_3$ lasting during each of the data blocks $P_1'$-$R_4'$ to specify each block duration, as shown at $CK_1$-$CK_3$ in FIG. 8. Each block pulse $CK_1$, $CK_2$, and $CK_3$ is successively and repeatedly given from the control unit 78 in synchronism with the input symbol succession [a]. As a result, each block is specified by presence of each block pulse $CK_1$, $CK_2$, and $CK_3$.

The encoder section 76 is supplied with first, second, and third situation signals SP, SQ, and SR representative of situations of the first, the second, and the third channels CHP, CHQ, and CHR, respectively. Each of the situation signals SP, SQ, and SR may be an alarm signal and the like. The situation signals are transmitted as the subsidiary signals if transmission of the subsidiary signals is requested by each channel CHP, CHQ, and CHR. As one of the subsidiary signals, the block synchronizing signal can be produced from this transmitter to separate, in a receiver, the transmitter output symbol succession [c*] into each of the blocks. Such a block synchronizing signal is inevitable when the blocks are allocated to the parallel sequences [e] and [f] illustrated in FIG. 8. Specifically, each block delivered from three channels CHP, CHQ, and CHR is interspersed in both of the parallel sequences [e] and [f]. Therefore, a reference block should be indicated to separate each block and, otherwise, separation of each block is not possible from the transmitter output symbol succession [c*].

Under the circumstances, the block synchronizing signal is sent from the transmitter to the transmission line 77 together with the situation signals SP, SQ, and SR as the subsidiary signals.

In FIG. 9, the encoding section 76 is supplied with the input symbol succession [a] in the form of the parallel sequences [e] and [f]. In other words, each symbol (for example, $a_n$) having one of the four levels is represented by two input parallel bits e and f. It is assumed here that the bit f is the least significant bit while the bit e, the more significant one. On this assumption, the symbol $a_n$ can be represented by a combination of the parallel bits e and f, as shown in Table 5.

TABLE 5

| $a_n$ | f | e |
|---|---|---|
| 0 | 0 | 0 |
| 1 | 1 | 1 |
| 2 | 0 | 1 |
| 3 | 1 | 1 |

The encoding section 76 comprises similar parts and successions designated by like reference numerals and letters in FIGS. 3 and 4. The intermediate symbol succession [b] includes the particular, the first, the second, and the third intermediate symbols $b_n$, $b_{n-2}$, $b_{n-4}$, and $b_{n-6}$, each of which is represented by two parallel bits, like the input symbol succession [a].

Responsive to the input symbol typified by the particular input symbol $a_n$ arranged in the particular time slot, the adder 21 carries out, modulo four, addition of the particular input symbol $a_n$ and the feedback symbol of two bits. A result of the addition appears as the particular intermediate symbol $b_n$. A carry signal y also is produced to represent a carry when the result is equal to or more than four. The particular intermediate symbol $b_n$ is given to the delay circuit 22 having the delay time equal to two time slots. The delay circuit 22 produces the first intermediate symbol $b_{n-2}$ earlier than the particular intermediate symbol $b_n$ by two time slots. The first intermediate symbol $b_{n-2}$ is delivered to the adder 22 as the feedback symbol in a bit parallel fashion. Thus, a combination of the adder 21 and the delay circuit 22 is operable as a precoder for producing the intermediate symbol succession [b] in accordance with Equation (1).

The first intermediate symbol $b_{n-2}$ is supplied to the delay circuit 38 followed by the delay circuit 39. Each of the delay circuits 38 and 39 has the delay time equal to two time slots and delays two parallel bits the delay time. As a result, the delay circuits 38 and 39 produce the second and the third intermediate symbols $b_{n-4}$ and $b_{n-6}$ in the bit parallel fashion, respectively.

The particular and the first through third intermediate symbols $b_n$ and $b_{n-2}$–$b_{n-6}$ are monitored in a manner to be described later.

It is mentioned here that the encoding section 76 fails to use the subtractor 23 illustrated with reference to FIGS. 3 and 4 and that the carry signal y is sent to the delay circuit 36 of three bits together with the input parallel bits e and f. This is because a combination of the carry signal y and the input parallel symbols e and f is equivalent to each symbol ($c_n$) of the encoded symbol succession [c], as shown in Table 6.

TABLE 6

| $a_n$ | $b_n$ | $b_{n-2}$ | $c_n$ | $a_n \oplus b_{n-2}$ | y |
|---|---|---|---|---|---|
| 0 | 0 | 0 | 0 | 0 | 0 |
|   | 1 | 1 |   | 1 |   |
|   | 2 | 2 |   | 2 |   |
|   | 3 | 3 |   | 3 |   |
| 1 | 1 | 0 | 1 | 1 | 0 |
|   | 2 | 1 | 1 | 2 | 0 |
|   | 3 | 2 | 1 | 3 | 0 |
|   | 0 | 3 | −1 | 0 | 1 |
| 2 | 2 | 0 | 2 | 2 | 0 |
|   | 3 | 1 | 2 | 3 | 0 |
|   | 0 | 2 | −2 | 0 | 1 |
|   | 1 | 3 | −2 | 1 | 1 |
| 3 | 3 | 0 | 3 | 3 | 0 |
|   | 0 | 1 | −1 | 0 | 1 |
|   | 1 | 2 | −1 | 1 | 1 |
|   | 2 | 3 | −1 | 2 | 1 |

In Table 6, the particular input symbol $a_n$ is representative of a combination of the input parallel bits e and f. The particular encoded symbol $c_n$ is representative of that difference between the particular and the first intermediate symbols $b_n$ and $b_{n-2}$ which is calculated in accordance with Equation (2). The fifth and the sixth columns in Table 6 are representative of the result of addition and the carry (y) produced from the adder 21, respectively.

As readily understood from Table 6, the particular encoded symbol $c_n$ is specified by the combination of the particular input symbol $a_n$ and the carry (y). More particularly, the respective levels "−3," "−2," "−1," "0," "1," "2," and "3" of the particular encoded symbol $c_n$ are represented by those combinations of the input symbol levels ($a_n$) and the carries (y) which are given by "1,1," "2,1," "3,1," "0,0," "1,0," "2,0," and "3,0," respectively. Thus, it is possible to represent the class IV partial response code by combining the input symbol succession [a] and the carry signal y.

Under these circumstances, the delay circuit 36 is supplied with the input parallel bits e and f and the carry signal y in the bit parallel fashion. The delay circuit 36 has a delay time equal to two time slots, as symbolized by 2T and a capacity of three bits for the input parallel bits e and f and the carry signal y. Coupled to the delay circuit 36, the delay circuit 37 is similar in structure to the delay circuit 36 and produces the encoded symbol of three bits earlier than the particular encoded symbol $c_n$ by four time slots, as shown by $c_{n-4}$. The encoded symbol $c_{n-4}$ is given by parallel bits e' and f' and a carry signal y' preceding the particular encoded signal $c_n$ by four time slots. The parallel bits e' and f' and the carry signal y' may be referred to as delayed parallel bits and delayed carry signal.

In the encoded symbol $c_{n-4}$ of three bits, the carry signal y is sent to a multilevel converter 80 through the inverter circuit 46 (will be described later in detail) in the form of an inverted carry signal $\bar{y}'$ while the remaining bits e' and f' are directly sent to the multilevel converter 80. Thus, the multilevel converter 81 is supplied with a modified encoded symbol represented by a combination of e', f', and $\bar{y}'$.

The multilevel converter 80 converts the modified encoded symbol into one symbol of the transmitter output symbol succession [c*] in accordance with a rule as shown in Table 7.

TABLE 7

| a' | $\bar{y}'$ | e' | f' | c* |
|---|---|---|---|---|
| 3 | 1 | 1 | 1 | 3 |
| 2 | 1 | 1 | 0 | 2 |
| 1 | 1 | 0 | 1 | 1 |
| 0 | 1 | 0 | 0 | 0 |
| 3 | 0 | 1 | 1 | −1 |
| 2 | 0 | 1 | 0 | −2 |
| 1 | 0 | 0 | 1 | −3 |

In Table 7, the input symbol denoted by a' has one of four levels represented by 0, 1, 2, and 3 and is equivalent to a combination of the delayed parallel bits e' and f'. Each symbol level of the input symbol a' is converted into a prescribed one of seven levels of the output symbol c* with reference to the inverted carry signal $\bar{y}'$. In the example being illustated, the output symbol c* takes one of the minus levels when the inverted carry signal $\bar{y}'$ has a zero level and, otherwise, the output symbol c* takes a plus or zero level.

Further referring to FIG. 9, the encoding section 76 comprises the detection circuit 40 responsive to the symbol group of the third, the second, the first, and the particular intermediate symbols $b_{n-6}$, $b_{n-4}$, $b_{n-2}$, and $b_n$. The pattern detector 40 serves to monitor patterns of the symbol group to search for those patterns relevant to the intentional violations described in the previous chapter of the quaternary system. To this end, four of the predetermined patterns of the symbol group are selected from Table 3. In the illustrated pattern detector 40, the patterns BB, BK, BE, and BH are used as the four predetermined patterns. Specifically, the patterns BB and BK are represented by the use of quaternary notation by "0, 2, 0, 0" and "3, 1, 3, 3" while the patterns BE and BH, "1, 3, 0, 0" and "2, 0, 3, 3," respectively. Herein, the patterns BB, BK, BE, and BH are called first, second, third, and fourth patterns, respectively. Further, operations related to the first through fourth patterns will be referred to as first, second, third, and fourth cases, respectively.

The detection circuit 40 comprises first, second, third, and fourth detectors 81, 82, 83, and 84 for detecting the respective first through fourth patterns BB, BK, BE, and BH. Each of the first through fourth detectors 81-84 is constituted by a gate circuit responsive to the third, the second, the first, and the particular intermediate symbols $b_{n-6}$, $b_{n-4}$, $b_{n-2}$, and $b_n$, each being given in the binary fashion of two bits. As a result, it appears that the first detector 81 montiors a binary pattern of "00; 10; 00; 00" equivalent to the first pattern BB. Likewise, each of the second through fourth patterns BK, BE, and BH is monitored in the binary fashion in each detector 82, 83, and 84.

Temporarily referring back to FIG. 8, each block pulse $CK_1$ appears during presence of the data blocks P' (suffixes being omitted) in the sequence e. In other words, each block pulse $CK_1$ may be used to locate the data blocks P'. If the data blocks P' are located, the remaining data blocks Q' and R' can automatically be located with reference to the data blocks P'. From this fact, it will be seen that the block synchronizing signal described before may be produced in synchronism with the block pulses $CK_1$.

Turning to FIG. 9, the first and the second detectors 81 and 82 are coupled through an OR gate 86 to an AND gate 87 enabled by each of the block pulses $CK_1$. The AND gate 87 is coupled through an OR gate 88 to the inverter circuit 46. In this structure, each output signal of the first and the second detectors 81 and 82 is sent as an enable pulse m through the AND gate 87 to the inverter circuit 46 only during presence of the block pulses $CK_1$. This means that the output signals of the first and the second detectors 81 and 82 are timed by the block pulses $CK_1$ to specify each data block P' in the sequence e illustrated in FIG. 8. On the other hand, the output signals of the first and the second detectors 81 and 82 are not sent to the inverter circuit 46 during presence of the remaining data blocks Q' and R' in the sequence e even when the first and the second patterns BB and BK are detected by the first and the second detectors 81 and 82. In addition, each output signal of the first and the second detectors 81 and 82 is synchronized with the encoded symbol $c_{n-4}$ earlier than the particular symbol $c_n$ by four time slots. p The inverter circuit 46 comprises an Exclusive OR gate 91 responsive to the carry signal y' and the enable pulse m. The carry signal y' is inverted or modified in polarity during presence of the enable pulse m by the Exclusive OR gate 91. The modified carry signal is polarity inverted by an inverter gate 92 to produce the inverted carry signal $\bar{y}'$ listed in Table 7. As is apparent from Table 7, the inverted carry signal $\bar{y}'$ may be recognized as the most significant bit of three bits e', f', and $\bar{y}'$. As the result of modification of the most significant bit, the levels "3," "2," and "1" of the output symbol c* can be interchanged with "−1," "−2," and "−3," respectively, as understood from Table 7.

Thus, such modification of the carry signal y' implies that the intentional violation is given to the output symbol c* of the succession [c*] for transmission of the block synchronizing signal. In the illustrated encoding section 76, the first and the second patterns BB and BK are used to carry the block synchronizing signal. This is because d.c. components are balanced on the transmission line by the use of two patterns and are, therefore, scarcely disturbed despite of addition of the intentional violation, if both of the two patterns are generated in equal probability. Accordingly, the class IV partial response code, which is inherently excellent in the balance of the d.c. components, is not susceptible to any disturbance in the d.c. components even by the addition of the intention violation.

In FIG. 9, the third and the fourth detectors 83 and 84 are coupled through an OR gate 93 to AND gates 94, 95, and 96 supplied with the block pulses $CK_1$, $CK_2$, and $CK_3$ shown in FIG. 8, respectively. The AND gates 94, 95, and 96 are also supplied with the first, the second, and the third situation signals SP, SQ, and SR given from each channel.

The situation signals SP, SR and SQ are delivered as the enable pulse m through the AND gates 94, 95, and 96 in accordance with the block pulses $CK_1$, $CK_2$, and $CK_3$, respectively, only when each of the output signals of the third and the fourth detectors 83 and 84 appears. Herein, the block pulses $CK_2$ and $CK_3$ are produced in timed relation to the data block R' and Q' arranged in the sequence e, as shown in FIG. 8, respectively, as is the case with each block pulse $CK_1$. Therefore, the situation signals SP, SR, and SQ are timed by the block pulses $CK_1$, $CK_2$, and $CK_3$, respectively, and gives the intentional violation to the output symbol c*, provided that either the third pattern BE or the fourth pattern BH is detected by the detection circuit 40. Thus, the delayed carry signal y' is modified by the enable pulse m in the inverter circuit 46, like in the first and the second patterns BB and BK. By the use of both of the third and the fourth patterns BE and BH, d.c. components are also favorably balanced in spite of addition of the intentional violation.

As mentioned above, both of the block synchronizing signal and the situation signals can be transmitted as the subsidiary signals in addition to the main information signal and are carried by giving the intentional violations to the output symbol succession [c*].

In the meantime, mention will be made of correlations among the input, the intermediate, the delayed encoded, and the output symbol successions [a], [b], [c], and [c*]. As shown in Table 8, consideration is made of the first, the second, the third, and the fourth cases. It is assumed in each case that the symbol groups of the intermediate symbol succession [b] are coincident with the first, the second, the third, and the fourth patterns BB, BK, BE, and BH, respectively.

TABLE 8

| | First Case | | | | Second Case | | | |
|---|---|---|---|---|---|---|---|---|
| [a] | Z x | 2 x | 2 x 0 | [a] | Z x | 2 x 2 x 0 | | |
| [b] | 0 x | 2 x | 0 x 0 | [b] | 3 x | 1 x 3 x 3 | | |
| [c] | Y x | 2 x | −2 x 0 | [c] | Y x | −2 x 2 x 0 | | |
| [c*] | Y x | −2 x | −2 x 0 | [c*] | Y x | 2 x 2 x 0 | | |

| | Third Case | | | | Fourth Case | | | |
|---|---|---|---|---|---|---|---|---|
| [a] | Z x | 2 x | 1 x 0 | [a] | Z x | 2 x 3 x 0 | | |
| [b] | 1 x | 3 x | 0 x 0 | [b] | 2 x | 0 x 3 x 3 | | |
| [c] | Y x | 2 x | −3 x 0 | [c] | Y x | −2 x 3 x 0 | | |
| [c*] | Y x | −2 x | −3 x 0 | [c*] | Y x | 2 x 3 x 0 | | |

In every one of the cases, the successions are located in time slots arranged in order of (n−6), (n−4), (n−2), and n, as are the cases with Tables 3 and 4. The above-mentioned modification or intentional violation operation is presumed to be carried out in timed relation to the time slot (n−4) of each case. It appears that the delayed encoded symbol $c_{n-4}$ of each case is polarity inverted into the output symbol $c^*_{n-4}$. In Table 8, the delayed encoded symbol $c_{n-4}$ *l of every case takes the level of* "2" or "−2." By selecting the above-mentioned patters of the output symbol succession [c*], a reduction is possible of unbalance of the d.c. components which may result from addition of the intentional violations.

Figure 10:
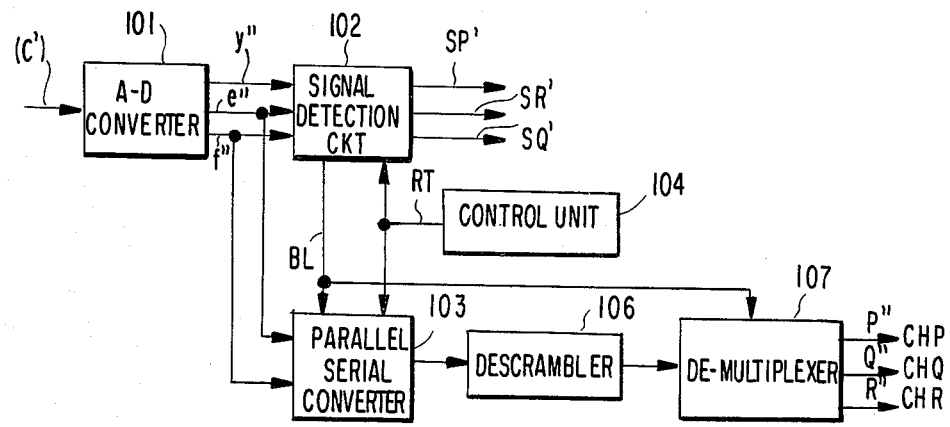
FIG. 10 shows a block diagram of a receiver for use in combination with the transmitter illustrated in FIG. 9.

Referring to FIG. 10, a receiver for use in the transmission system according to the second embodiment of this invention is responsive to a receiver input symbol succession sent from the transmitter illustrated in FIG. 7 as the transmitter output symbol succession [c*]. The receiver input symbol succession is not always equal to the transmitter output symbol succession [c*] due to unintentional violations undesiredly occurring during transmission of the transmitter output symbol succession [c*] and is, therefore, designated by [c'], like in the receiver illustrated in FIG. 5. The receiver input symbol is, therefore, septenary and is subjected to the intentional violations described with reference to FIGS. 7 and 8. In other words, the block synchronizing and the situation signals can be derived from the receiver input symbol succession [c'] by the use of the intentional violations.

The receiver comprises an analog-to-digital converter 101 for converting the receiver input symbol succession [c'] to three sequences e", f", and y" corresponding to a reproduction of the sequences e, f, and $\bar{y}'$ illustrated with reference to FIG. 9, respectively. The sequences e", f", and y" appear in the form of three parallel bits for each symbol of the input symbol succession [c'] and are sent to a signal detection circuit 102 to be described in detail with reference to FIG. 11. Among the three sequences, two sequences e" and f" are supplied to a parallel-serial converter 103. The parallel-serial converter 103 converts the sequences e" and f" into a single data stream with reference to a reception timing signal RT and a block synchronizing signal BL. The reception timing signal RT is delivered from a receiver control unit 104 operable in a well-known manner to carry out operation for bit synchronization. The block synchronizing signal BL is derived by the signal detection circuit 102 in a manner to be described and sent from the signal detection circuit 102 to the parallel-serial converter 103.

Responsive to the single data sequence given from the parallel-serial converter 103, a descrambler 106 produces a data stream M' representative to a reproduction of the multiplexed data stream M shown in FIG. 7. A demultiplexer 107 demultiplexes or separates the reproduced data stream M' into first, second, and third data streams P", Q", and R" with reference to the block synchronizing signal BL. The first through third data streams P", Q", and R" are representative of reproductions of the first through third data streams P, Q, and R, respectively, and are allotted to first, second, and third data channels CHP, CHQ, and CHR, respectively. The reproduced data streams P", Q", and R" may be distributed to suitable output devices (not shown).

Figure 11:
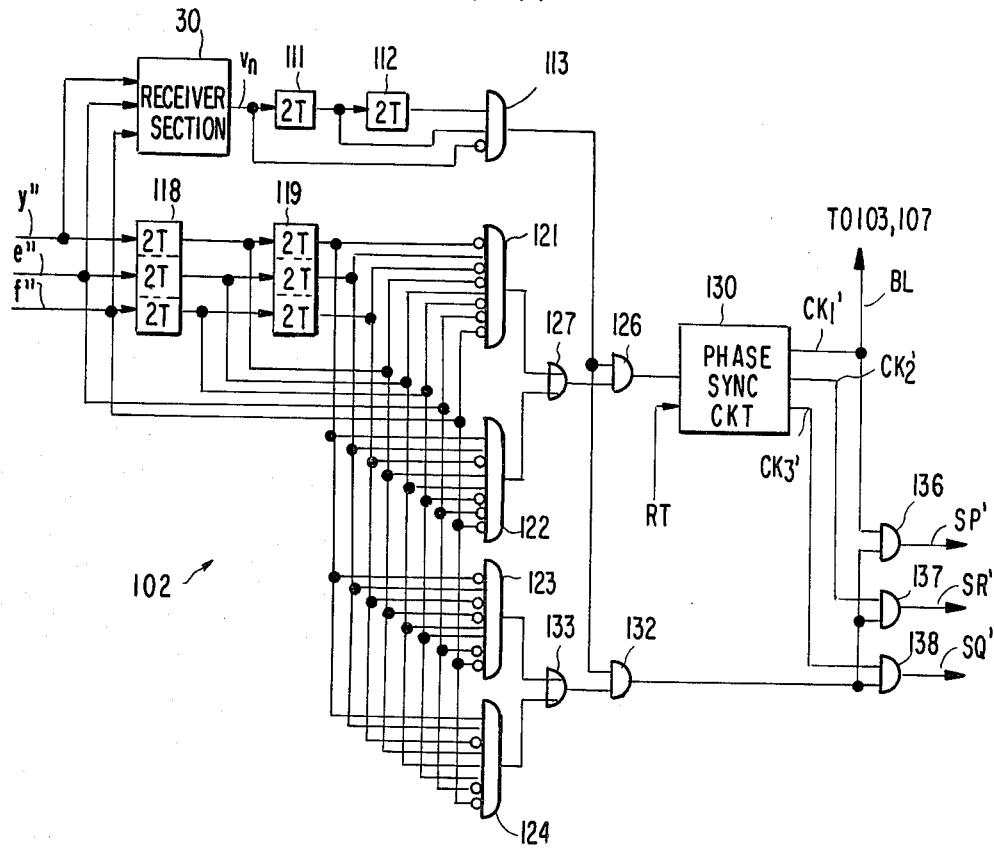
FIG. 11 shows a block diagram of a signal detection circuit used in the receiver illustrated in FIG. 10.

Referring to FIG. 10 again and FIG. 11 afresh, the signal detecting circuit 102 comprises a receiver section 30 similar to that illustrated with reference to FIG. 2 except that the decoder 26 is removed from the receiver section of FIG. 11 and that the violation detector 29 illustrated in FIG. 2 is operable in a quaternary fashion to produce the violation signal sequence [v]. The detecting rules of the violation detector included in the signal detecting circuit 30 of FIG. 11 are readily given by substituting four for N.

In the transmitter, when the intentional violations are imposed on the transmitter output symbol succession [c*] as a result of appearance of each of the first through fourth patterns BB, BK, BE, and BH, the receiver input symbol succession [c'] exhibits the patterns specified in Table 9, as readily understood from Table 3. In Table 9, the patterns of the sum symbol succession [s] are shown together with the corresponding patterns BB, BK, BE, and BH and are accompanied by the patterns of the violation signal sequence [v] which are obtained by detecting the sum symbol succession [s] in accordance with the detecting rules.

At any rate, two consecutive violation signals v are produced by the receiver section 30 when the intentional violations are imposed on the succession [c'] by the use of the first through fourth patterns BB, BK, BE, and BH.

TABLE 9

| | First Case | | | | Second Case | | | |
|---|---|---|---|---|---|---|---|---|
| | n-6 | n-4 | n-2 | n | n-6 | n-4 | n-2 | n |
| [c'] | Y x | −2 x | −2 x | 0 [c'] | Y x | 2 x | 2 x | 0 |
| [s] | 0 x | −2 x | −2 x | 0 [s] | 3 x | 5 x | 5 x | 3 |

TABLE 9-continued

| [v] | 0 x | 1 x | 1 x | 0 | [v] | 0 x | 1 x | 1 x | 0 |
|---|---|---|---|---|---|---|---|---|---|
| | Third Case | | | | | Fourth Case | | | |
| | n-6 | n-4 | n-2 | n | | n-6 | n-4 | n-2 | n |
| [c'] | Y x | −2 x | −3 x | 0 | [c'] | Y x | 2 x | 3 x | 0 |
| [s] | 1 x | −1 x | −3 x | 0 | [s] | 2 x | 4 x | 6 x | 3 |
| [v] | 0 x | 1 x | 1 x | 0 | [v] | 0 x | 1 x | 1 x | 0 | p The violation signal sequence [v] is supplied through first and second delay circuits 111 and 112 to a gate circuit 113. Each of the first and the second delay circuits 111 and 112 has a capacity of a single bit and a delay time equal to two time slots depicted at 2T. The gate circuit 113 produces the logic "1" level when the pattern of "1," "1," and "0" appears from the second and the first delay circuits 112 and 111 and the section 30, respectively. As a result, the two consecutive violation signals are distinguished from the violation signal sequence [v].

The signal detecting circuit 102 further comprises a third delay circuit 118 of three bits having a delay time equal to two time slots and responsive to the three sequences e″, f″, and y″. The third delay circuit 118 is followed by a fourth delay circuit 119 similar to the third delay circuit 118.

The sequences e″ and f″ are sent to first, second, third, and fourth gate circuits 121, 122, 123, and 124, each being coupled to both of the third and the fourth delay circuits 118 and 119. The first through fourth gate circuits 121–124 are for detecting the patterns of the input symbol succession [c'] shown in the first through fourth cases of Table 9, in the binary form, respectively. More particularly, each gate circuit 121–124 monitors three symbols of the input symbol succession [c'] which are arranged in the time slots (n−4), (n−2), and n. In any one of the first through fourth cases, a particular symbol located in a particular time slot n is representative of the level of "0." Therefore, the sequence y″ may be left out of consideration as regards the particular symbol. Under the circumstances, the first gate circuit 121 is enabled in response to the input symbols of "−2," "−2," and "0," which are denoted by "010," "010," and "00" in the binary form, as readily understood from Table 7. Likewise, the second gate circuit 122 is enabled in response to the input symbols of "2," "2," and "0," which are denoted by the binary form of "110," "110," and "00." Similarly, the third and the fourth gate circuits 123 and 124 are enabled by "−2," "−3," and "0," and "2," "3," and "0," respectively.

It should be recollected here that appearances of the three input symbols in the first and the second cases are related to production of the block synchronizing signal in the transmitter while appearances of the input symbols in the third and the fourth cases are related to the situation signals in the transmitter.

When either the first gate circuit 121 or the second one 122 is enabled simultaneously with the gate circuit 113, a first AND gate 126 is enabled through an OR gate 127 to produce the logic "1" level. Responsive to the reception timing signal RT sent from the receiver control unit 104 illustrated in FIG. 10, a phase synchronization circuit 130 synchronizes the output signal of the first AND gate 126 with the reception timing signal RT to produce first, second, and third block pulses CK$_1'$, CK$_2'$, and CK$_3'$ which are reproductions of the first, the second, and the third block pulses CK$_1$, CK$_2$, and CK$_3$ shown in FIG. 8, respectively. Herein, the first block pulse CK$_1'$ is delivered to the parallel-serial converter 103 and the demultiplexer 107 as a block synchronizing signal BL.

When either the third gate circuit 123 or the fourth one 124 is enabled together with the gate circuit 113, a second AND gate 132 is enabled through an OR gate 133 to produce the logic "1" level as a reception signal indicative of reception of one of the situation signals. The reception signal is given to AND gates 136, 137, and 138 and is delivered as reproduced situation signals SP', SR', and SQ' from the AND gates 136, 137, and 138 in accordance with the first, the second, and the third reproduced block pulses CK$_1$, CK$_2$, and CK$_3$, respectively.

The reproduced situation signals SP', SR', and SQ' are supplied, to the output devices together with the first through third data streams P″, R″, and Q″, respectively.

The description has thus far been made on the assumption that a code error rarely takes place in the receiver input symbol succession [c'] in connection with the transmission system according to the second embodiment. However, it is possible to detect and correct the code error by monitoring the violation signal sequence, as is the case with the transmission system according to the first embodiment.

Thus, transmission becomes possible of a plurality of subsidiary signals in addition to the main information sequence without an increase of time slots to be allotted to the subsidiary signals. In addition, the intentional violations are distinguished from the unintentional violations giving rise to code errors.

While this invention has thus far been described in conjunction with a few embodiments thereof, it is readily possible for those skilled in the art to practice this invention in various manners. For example, the remaining patterns of Table 3 except the first through fourth patterns may be selected to give the intentional violations. The intentional violations may be given to transmit the block synchronizing signal alone. In this case, a single pattern may be selected from Table 3. Alternatively, more than four patterns may be used for transmission of various subsidiary signals.

What is claimed is:

1. A data transmission system comprising a transmitter responsive to a transmitter input symbol succession of symbols located in every time slot for producing a transmitter output symbol succession in accordance with an encoding rule determined for a class IV partial response code and a receiver responsive to a receiver input symbol succession of the class IV partial response code for producing a receiver output symbol succession as a reproduction of said transmitter input symbol succession, said transmitter output symbol succession being disturbed in said encoding rule when subjected to unintentional and intentional violations, said transmitter output symbol succession appearing as said receiver input symbol succession, said transmitter comprising:

first means responsive to said transmitter input symbol succession and a feedback symbol succession of feedback symbols for successively carrying out addition of said transmitter input symbols and said feedback symbols to produce an intermediate symbol succession of intermediate symbols located one in every time slot;

second means coupled to said first means for producing an encoded symbol succession of encoded symbols, one in each time slot, in conformity to said encoding rule with reference to said intermediate symbols;

third means responsive to said intermediate symbol succession for delaying each of said intermediate symbols to produce first, second, and third ones of said intermediate symbols that are earlier than a particular one of said intermediate symbols by two, four, and six time slots, respectively, said first intermediate symbol being successively fed back to said first means as each of said feedback symbols, said particular intermediate symbol being produced in response to a particular one of said transmitter input symbols;

fourth means coupled to said third means and responsive to a symbol group of said third, said second, said first, and said particular intermediate symbols arranged in succession for monitoring said symbol group to produce an intentional violation signal indicative of said intentional violation each time when a pattern given by said symbol group is coincident with one of predetermined patterns; and fifth means coupled to said second means and responsive to said intentional violation signal for modifying said encoded symbol succession into said transmitter output symbol succession to intentionally violate said encoding rule;

said receiver comprising:

means for decoding said receiver input symbol succession into said reproduction of said transmitter input symbol succession without influence of said intentional violation;

first detecting means for detecting both of said unintentional and said intentional violations from said receiver input symbol succession to produce a sequence of violation signals which are representative of both violations with said violation signals arranged in the time slots, respectively, each of said unintentional violations appearing as a sole violation signal in said violation signal sequence while each of said intentional violations appears as two consecutive ones of said violation signals arranged in two consecutive ones of the time slots with one time slot left therebetween, each of said predetermined patterns being selected so that each intentional violation is detected as said two consecutive violation signals; and second detecting means for detecting said each intentional violation from said violation signal sequence.

2. A transmission system as claimed in claim 1, each symbol of said transmitter input symbol succession being represented by a binary signal having either of a logic "1" level and a logic "0" level, wherein said fourth means comprises:

first logic means responsive to said symbol group for producing said intentional violation signal when said pattern of said symbol group is equal to a first of said predetermined patterns that is given by a succession of the logic "0," "1," "0," and "0" levels; and second logic means responsive to said symbol group for producing said intentional violation signal when said pattern of said symbol group is equal to a second of said predetermined patterns that is given by a succession of the logic "1," "0," "1," and "1" levels;

said second means comprising means for producing each encoded symbol of said encoded symbol succession in synchronism with said second intermediate symbol preceding said particular intermediate symbol, each encoded symbol being respresentative of one of ternary plus one, ternary zero, and ternary minus one levels that is selected in accordance with said encoding rule;

said fifth means comprising means responsive to said encoded symbol succession and said intentional violation signal for polarity inverting the encoded symbol synchronized with said second intermediate symbol to modify said encoded symbol succession into said transmitter output symbol succession, said encoded symbols synchronized with said second intermediate symbol taking either of said ternary plus one and said ternary minus one levels.

3. A transmission system as claimed in claim 2, wherein said first detecting means comprises:

sum means responsive to said receiver input symbol succession and an additional input symbol succession of additional symbols for producing a sum succession of sum symbols each of which is represented by a sum level, each additional symbol having either of a first level and a second level higher than said first level;

detection means responsive to said sum succession for detecting said sum level to produce a detection signal and said violation signals, said sum level being variable in excess of said first and said second levels, said detection taking said first level when said sum level is not higher than said first level, said detection taking the second level when said sum level is not lower than said second level, said violation signals being produced when said sum level is lower and higher than said first and said second levels, respectively;

delay means having a delay time equal to two of the time slots for delaying said detection signal during said delay time to produce a delayed detection signal; and supply means for successively supplying said sum means with said delayed detection signal as each of said additional symbols to provide said additional input symbol succession.

4. A transmission system as claimed in claim 3, wherein said second detecting means comprises:

delaying means responsive to said violation signal sequence and having a delay time equal to two of the time slots for delaying each of said violation signals during said delay time to produce a delayed violation signal; and means responsive to said violation signals and said delayed violation signals for producing each of violation reception signals representative of a reception of each intentional violation only when said violation signals coexist with said delayed violation signal, to distinguish said intentional violations from said violation signal sequence.

5. A transmission system as claimed in claim 4, wherein said second detecting means comprises:

means having a prescribed threshold level for counting said violation reception signal in number to compare a result of counting with said prescribed threshold level and to produce an output signal when said result exceeds said prescribed threshold level.

6. A transmission system as claimed in claim 5, wherein said second detecting means comprises:

means responsive to said delayed violation signal and said violation reception signal for distinguishing said sole violation signal from said violation signal sequence.

7. A transmission system as claimed in claim 1, each symbol of said transmitter input symbol succession having one of a first predetermined number of levels equal to N ($\geq 3$), each symbol of said encoded and said transmitter output symbol successions being specified by one of a second predetermined number of levels equal to ($2N-1$), wherein said fifth means comprises processing means responsive to said intentional violation signal for processing, modulo N, said encoded symbol succession to modify the same into said transmitter output symbol succession.

8. A transmission system as claimed in claim 7, each symbol of said receiver input symbol succession being specified by one of said second predetermined number of levels, wherein said first detecting means comprises:
   summing means responsive to said receiver input symbol succession and an additional input symbol succession of additional symbols for producing a sum succession of sum symbols each of which is represented by a sum level, each additional symbol having one of levels equal in number to said first predetermined number and laid between a first and a second preselected level specified as "0" and "$N-1$" levels, respectively;
   detecting means responsive to said sum succession for detecting said sum level to produce a detection signal representative of one of said first predetermined number of levels in accordance with sum level, said sum level being variable in excess of said first and said second preselected levels, said detecting signal taking the first preselected level when said sum level is not higher than said first preselected level, said detecting signal taking the second preselected level when said sum level is not lower than said second preselected level;
   delay means having a delay time equal to two of the time slots for delaying said detection signal during said delay time to produce a delayed detection signal; and
   supplying means for successively supplying said summing means with said delayed detection signal as each of said addition symbols to provide said additional input symbol succession.

9. A transmission system as claimed in claim 8, wherein said second means comprises means for producing each encoded symbol of said encoded symbol succession in synchronism with said second intermediate symbol.

10. A transmission system as claimed in claim 8, said first and said second predetermined numbers being equal to four and seven, respectively, wherein said fourth means comprises:
   producing means responsive to said symbol group for producing said intentional violation signal when said succession of said symbol group is coincident with said predetermined patterns selected from the patterns of "0, 1, 0, 0," "0, 2, 0, 0," "1, 2, 0, 0," "0, 3, 0, 0," "1, 3, 0, 0," "2, 3, 0, 0," "1, 0, 3, 3," "2, 0, 3, 3," "3, 0, 3, 3," "2, 1, 3, 3," "3, 1, 3, 3," and "3, 2, 3, 3."

11. A transmission system as claimed in claim 10, said transmitter input symbol succession being separable into a plurality of symbol blocks arranged in said transmitter input symbol succession in a time division fashion, said transmitter being supplied with a block pulse specifying a particular one of said blocks during presence of said particular block, wherein said producing means comprises:
   first gate means coupled to said third means for producing said intentional violation signal when said pattern of said symbol group is coincident with a first one of said predetermined patterns;
   second gate means coupled to said third means for producing said intentional violation signal when said pattern of said symbol group is coincident with a second one of said predetermined patterns; and
   a gate circuit coupled to said first and said second gate means for delivering said intentional violation signal to said fifth means only during presence of said block pulse.

12. A transmission system as claimed in claim 11, said transmitter being supplied with a situation signal related to each symbol block, wherein said producing means further comprises:
   third gate means coupled to said third means for producing said intentional violation signal when said pattern of said symbol group is coincident with a third one of said predetermined patterns;
   fourth gate means coupled to said third means for producing said intentional signal when said pattern of said symbol group is coincident with a fourth one of said predetermined patterns; and
   means for allotting said intentional violation signal to each block in accordance with said situation signal.

13. A transmission system as claimed in claim 12, wherein said first, said second, said third, and said fourth predetermined patterns are given by "0, 2, 0, 0," "3, 1, 3, 3," "1, 3, 0, 0," and "2, 0, 3, 3," respectively.

14. A transmission system as claimed in claim 13, said encoded symbol succession being produced as first, second, third, and fourth sequences of "2, $-2$, 0," "$-2$, 2, 0," "2, $-3$, 0," and "$-2$, 3, 0" in accordance with said encoding rule when said patterns of said symbol groups are coincident with said first, said second, said third, and said fourth predetermined patterns, respectively, each sequence of said first through fourth sequences appearing in timed relation to said second, said first, and said particular intermediate symbols, wherein said processing means comprises means responsive to said first through fourth sequences and said intentional violation signal for modifying said first through fourth sequences in timed relation to said second intermediate symbol into those first, second, third, and fourth modified sequences of said transmitter output symbol succession which are equal to "$-2$, $-2$, 0," "2, 2, 0," "$-2$, $-3$, 0," and "2, 3, 0," respectively.

15. A transmission system as claimed in claim 14, said first through fourth modified sequences appearing as first, second, third, and fourth received sequences in said receiver input symbol succession, respectively, wherein said receiver further comprises:
   third detecting means responsive to said receiver input symbol succession for detecting said first through fourth received sequences to produce detection signals representative of detection of said received sequences; and
   reproducing means coupled to said second detecting means and responsive to said detection signals for reproducing said block pulse and said situation signal with reference to said detection signal and said each detected intentional violation.

16. A transmission system as claimed in claim 15, wherein said third detecting means comprises:

a first portion responsive to said receiver input symbol succession for detecting said first and said second received sequences to produce a first one of said detection signals that is representative of detection of either one of said first and said second received sequences; and a second portion responsive to said receiver input symbol succession for detecting said third and said fourth received sequences to produce a second one of said detection signals that is representative of detection of either one of said third and said fourth received sequences;

said reproducing means comprising:

means coupled to said second detecting means and responsive to said first detection signal for deriving said reproduced block pulse with reference to said first detection signal and said each detected intentional violation; and means coupled to said second detecting means for deriving said situation signal with reference to said second detection signal and said reproduced block pulse.

* * * * *

UNITED STATES PATENT AND TRADEMARK OFFICE
CERTIFICATE OF CORRECTION

PATENT NO. : 4,472,813
DATED : Sept. 18, 1984
INVENTOR(S) : Shinichi KOIKE et al It is certified that error appears in the above-identified patent and that said Letters Patent is hereby corrected as shown below:

Column 5, line 16, "carried" should be --carries--;

line 25, "violations" should be --violation--;

line 63, "of" should be --on--.

Column 6, line 22, after "violation", insert a --.--.

Column 16, line 21 Table 6 under column cn "1"

(4th occurrence) should be --3--.

Column 18, line 24, delete the "p" after "slots".

Column 19, line 48, "patters" should be --patterns--.

Column 20, line 24, "to" should be --of--.

Signed and Sealed this

Twenty-fourth Day of September 1985

[SEAL]

Attest:

DONALD J. QUIGG

Attesting Officer

Commissioner of Patents and
Trademarks—Designate